United States Patent
Park et al.

(10) Patent No.: US 9,587,984 B2
(45) Date of Patent: Mar. 7, 2017

(54) GONIO-SPECTRORADIOMETER AND MEASURING METHOD THEREOF

(71) Applicant: Korea Research Institute of Standards and Science, Daejeon (KR)

(72) Inventors: Seongchong Park, Daejeon (KR); Dong-Hoon Lee, Daejeon (KR); Chul-Woung Park, Daejeon (KR); Seung-Nam Park, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 0 days.

(21) Appl. No.: 15/165,814

(22) Filed: May 26, 2016

(65) Prior Publication Data

US 2016/0273966 A1 Sep. 22, 2016

Related U.S. Application Data

(63) Continuation of application No. PCT/KR2014/013008, filed on Dec. 30, 2014.

(30) Foreign Application Priority Data

Jan. 7, 2014 (KR) .......................... 10-2014-0001682

(51) Int. Cl.
*G01J 1/04* (2006.01)
*G01J 3/50* (2006.01)
(Continued)

(52) U.S. Cl.
CPC ............. *G01J 3/504* (2013.01); *G01J 3/0254* (2013.01); *G01J 3/04* (2013.01); *G01J 3/0262* (2013.01); *G01J 2003/045* (2013.01)

(58) Field of Classification Search
CPC .. G01N 21/0303; G01N 21/274; G01N 21/33; G01N 21/4738; G01N 21/59;
(Continued)

(56) References Cited

U.S. PATENT DOCUMENTS 5,098,195 A * 3/1992 Halyo ................... G01J 5/0003
356/236
5,359,406 A * 10/1994 Suzuki ....................... G01J 1/42
250/228
(Continued)

FOREIGN PATENT DOCUMENTS

JP 3 119 622 U 3/2006

OTHER PUBLICATIONS

International Search Report for Application No. PCT/KR2014/013008 dated Mar. 25, 2015.

*Primary Examiner* — Michael P Stafira
(74) *Attorney, Agent, or Firm* — Jenkins, Wilson, Taylor & Hunt, P.A.

(57) ABSTRACT

A gonio-spectroradiometer and a measuring method thereof. The gonio-spectroradiometer includes a light source rotating on a light source axis, a first integrating sphere revolving around the light source with respect to a revolving axis perpendicular to the light source axis with a fixed radius and including an entrance formed in a direction to see the light source, a light intensity modulator adapted to modulate light intensity of light received through the first integrating sphere according to the rotation amount of the revolving axis, and a detector adapted to measure output light of the light intensity modulator at each wavelength.

11 Claims, 8 Drawing Sheets

(51) Int. Cl.
*G01J 3/02* (2006.01)
*G01J 3/04* (2006.01)

(58) Field of Classification Search
CPC .............. G01N 21/8422; G01N 21/87; G01N 2201/0632; G01N 2201/0642
See application file for complete search history.

(56) References Cited

U.S. PATENT DOCUMENTS

| | | |
|---|---|---|
| 6,040,904 A | 3/2000 | Fallet et al. |
| 2009/0185173 A1 | 7/2009 | Ashdown et al. |
| 2014/0224970 A1* | 8/2014 | Ohkubo .................... G01J 1/08 250/216 |
| 2015/0355087 A1* | 12/2015 | Moggridge ........ G01N 21/4738 356/446 |
| 2016/0252451 A1* | 9/2016 | Kawate ................ G01N 21/474 |

* cited by examiner

GONIO-SPECTRORADIOMETER AND MEASURING METHOD THEREOF

CROSS-REFERENCE TO RELATED APPLICATIONS

This application is a continuation of and claims priority to PCT/KR2014/013008 filed on Dec. 30, 2014, which claims priority to Korea Patent Application No. 10-2014-0001682 filed on Jan. 7, 2014, the entireties of which are both hereby incorporated by reference.

BACKGROUND

1. Technical Field

The present disclosure relates to a gonio-spectroradiometer for measuring a total spectral radiant flux (unit: W/nm), which is one of the optical properties of a light-emitting device, at high speed.

2. Description of the Related Art

Total spectral radiant flux (unit: W/nm) of a light source is the sum of radiant flux (unit: W) per unit wavelength emitted in all direction. The total spectral radiant flux provides the information on total optical power at each wavelength of a light source. Accordingly, most of the optical properties of light sources such as luminous efficacy (unit: lm/W), total luminous flux (unit: lm), chromaticity, color rendering index, and a correlated color temperature (unit: K) can be obtained from the total spectral radiant flux. Accordingly, the total spectral radiant flux is important in performance evaluation of lighting apparatuses. In particular, it is more important to measure the total spectral radiant flux with respect to ultraviolet and infrared light sources.

In general, methods for measuring the total spectral radiant flux may be classified into a method for measuring and summing spectral irradiances (unit: $W/m^2/nm$) or spectral radiant intensities (unit: W/sr/nm) at respective positions around a measurement target light source and a method for comparing a total spectral radiant flux standard lamp of a known total spectral radiant flux value with a measurement target lamp using an integrating sphere.

The former method is a method using a gonio-spectroradiometer. Spectral radiant intensity or spectral irradiance must be measured and summed while a spectroradiometer of which the spectral radiant intensity or the spectral irradiance scale is calibrated rotates around a light source. In this case, a mechanical apparatus is required to rotate the spectroradiometer around the light source. Since it takes considerable time for the mechanical apparatus to rotate the spectroradiometer, measurement speed (measurement time) is very low (at least a few hours). However incidentally, an angular distribution of luminous intensity of the light source may be measured and accurate measurement for light sources having non-isotropic angular distribution of luminous intensity may be performed. In addition, it is possible to avoid an influence of fluorescence that often occurs when an ultraviolet light source is measured using an integrating sphere. Therefore, it is very efficient for an ultraviolet light source. In general, a gonio-spectroradiometer is used as a primary standard for measuring a total spectral radiant flux.

The latter method is a method using an integrating sphere spectroradiometer. Unlike the gonio-spectroradiometer, the integrating sphere spectroradiometer requires a standard lamp whose total spectral radiant flux is known. Since the measurement is basically a comparison measurement, measurement speed (measurement time) is very high (less than an few minutes). However, an additional uncertainty component related to angular distribution of luminous intensity gives an effect. Accordingly, when angular distribution of luminous intensity of a light source is significantly different from a point-like, isotropic light source, accuracy of an integrating sphere spectroradiometer is lower than that of a gonio-spectroradiometer. In addition, fluorescence on inner surface of the integrating sphere makes it very difficult to apply the latter method to an ultraviolet light source of 400 nm or less. Moreover, since a total spectral radiant flux standard lamp required to calibrate integrating sphere spectroradiometer can be calibrated only by the gonio-spectroradiometer, the integrating sphere spectroradiometer is used as a secondary standard.

SUMMARY

Embodiments of the present disclosure provide a gonio-spectroradiometer capable of measuring a total spectral radiant flux at high speed without an error caused by angular distribution of luminous intensity and fluorescence for a light source, an ultraviolet light source or an infrared light source having various directivities.

A gonio-spectroradiometer according to an example embodiment of the present disclosure includes a light source rotating on a light source axis, a first integrating sphere revolving around the light source with respect to a rotating axis perpendicular to the light source axis with a fixed radius and including an entrance formed in a direction to see the light source, a light intensity modulator adapted to modulate light intensity of light received through the first integrating sphere according to the rotation angle or amount of the revolving axis, and a detector adapted to measure output light of the light intensity modulator at each wavelength.

In an example embodiment, the light intensity modulator may include: a fixed slit plate having an opening of constant first width; a movable slit plate having a first slit having the first width and a second slit spaced apart from the first slit by the first width and having the first width; and a movable slit driving part adapted to move the movable slit plate according to a rotation angle of the revolution motion. An overlap area between the fixed slit and the movable slit may be a sine function of the rotation angle of the revolution motion according to the rotation angle of the movable slit plate.

In an example embodiment, the gonio-spectroradiometer may further include: a second integrating sphere having an entrance disposed between the light intensity modulator and the detector to receive output light of the light intensity modulator.

In an example embodiment, the detector may measure the light intensity at each wavelength integrated into a cycle of the revolution of the first integrating sphere.

In an example embodiment, the gonio-spectroradiometer may further include: a revolution rotating plate spaced apart from the light source by a fixed distance to rotate on the revolving axis; an light trap support plate connected to one end of the revolution rotating plate; an light trap mounted at the light trap support plate; and a revolution motion driving part disposed on the revolving axis of the revolution rotating plate to provide rotational force to the revolution rotating plate. The first integrating sphere mounted at the other end of the revolution rotating plate may be disposed opposite to the light trap.

In an example embodiment, the gonio-spectroradiometer may further include: a second integrating sphere having an entrance disposed between the light intensity modulator and the detector to receive output light of the light intensity modulator. The second integrating sphere may be disposed at the other end of the revolution rotating plate, the first integrating sphere and the second integrating sphere may be spaced apart from each other to be fixedly coupled with each other, and the light intensity modulator may be disposed between an exit of the first integrating sphere and an entrance of the second integrating sphere.

In an example embodiment, the gonio-spectroradiometer may further include: a revolution support plate extending vertically from the surface of the earth and supporting the revolution motion driving part; a first optical fiber having one end connected to an exit of the second integrating sphere; and a second optical fiber having one end to receive light from the other end of the first optical fiber. The other end of the second optical fiber may be connected to the detector, and the detector may be mounted at the revolution support plate.

A gonio-spectroradiometer according to an example embodiment of the present disclosure may have a rotating axis of a light source and a revolving axis perpendicular to the rotating axis of the light source. A measuring method of the gonio-spectroradiometer may include: measuring light emitted from the light source at each wavelength while modulation of the intensity of the light is performed as a function of a polar angle that is a rotation angle of the revolving axis during successive rotation of the rotating axis with respect to a predetermined integration period.

In an example embodiment, the modulation of the intensity of the light is $|\sin\theta|$.

In an example embodiment, the measuring method may further include: varying a rotation angle of the rotating axis of the light source.

In an example embodiment, the measuring method may further include: measuring light emitted from the light source at each wavelength while modulation of the intensity of the light is performed as a polar angle that is a polar angle of a rotating axis of the standard lamp and the revolving axis during successive rotation of the revolving axis with respect to a predetermined integration period using the standard lamp whose spectral radiant intensity or spectral irradiance is known.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Preferred embodiments of the present disclosure will be described below in more detail with reference to the accompanying drawings. The present disclosure may, however, be embodied in different forms and should not be constructed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
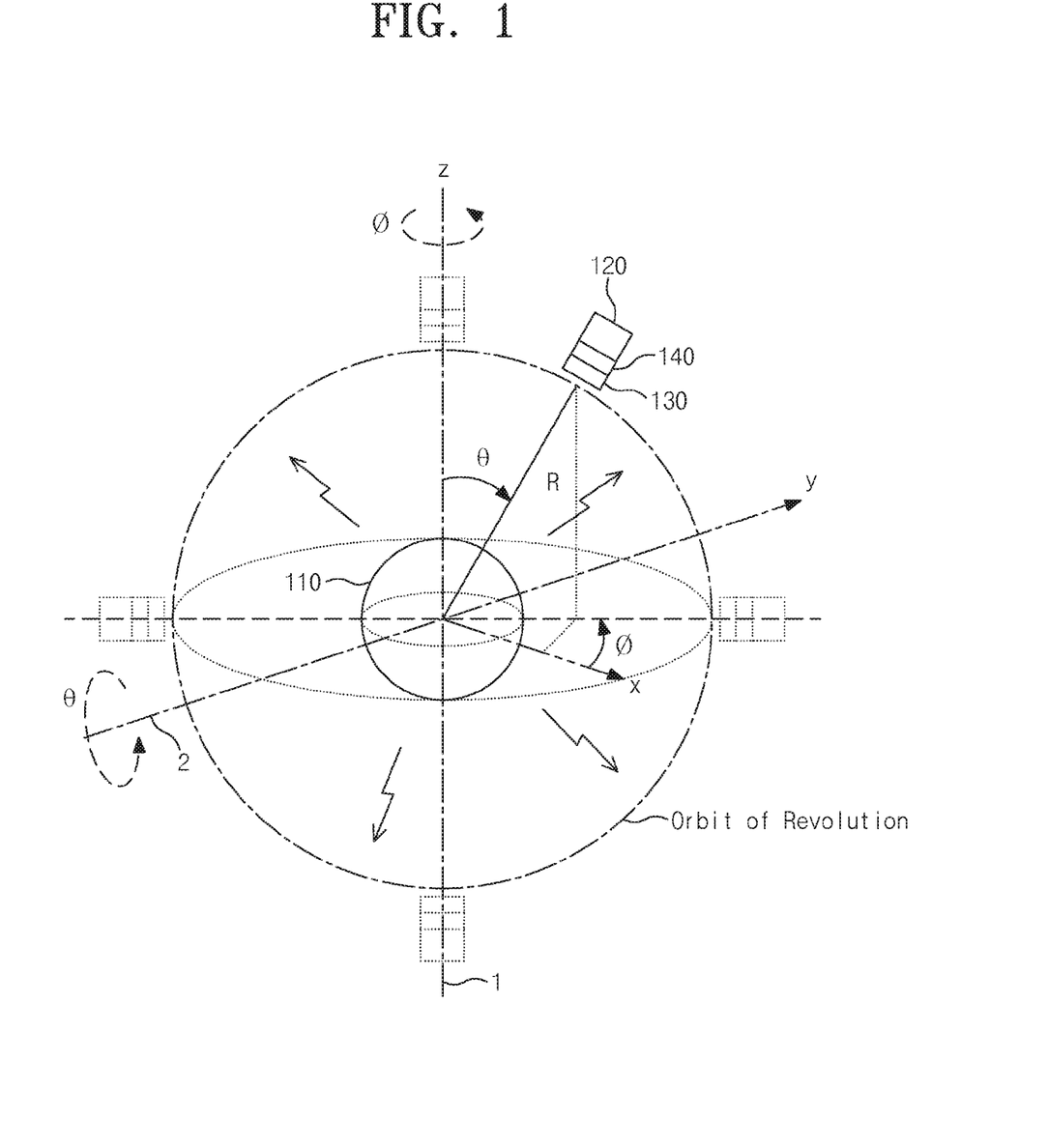
FIG. 1 illustrates the coordinate system of a gonio-spectroradiometer according to an example embodiment of the present disclosure.

FIG. 1 illustrates the coordinate system of a gonio-spectroradiometer according to an example embodiment of the present disclosure.

Referring to FIG. 1, assuming a typical spherical coordinate system (R, $\theta$, $\phi$), a gonio-spectroradiometer may be expressed as below.

The gonio-spectroradiometer may be roughly divided into three parts such as a rotating axis 1 of a light source 110, a rotating axis of a detector 120, and the detector 120.

The rotating axis 1 of the light source 110 rotates on its symmetrical axis. The light source 110 rotates within the range of the azimuthal angle $\phi$ between zero degree and 180 degrees through the rotation of the rotating axis 1. The light source 110 may perform rotation exercise according to the rotating axis 1.

The rotating axis 2 of the detector 120 rotates on the light source. The detector 120 or a first integrating sphere revolves the orbit of revolution within in the range of the polar angle $\theta$ between zero degree and 360 degrees.

The detector 120 is an optical detector to measure a spectral distribution of light emitted from the light source 110. The detector 120 may include a spectroradiometer whose spectral radiant intensity or spectral irradiance scale is calibrated.

The light source 110 desired to be measured is disposed in the center of the spherical coordinate system. The light source 110 may rotates in a direction of the azimuthal angle on the rotating axis 1 or a z-axis. Accordingly, the azimuthal angle $\phi$ indicating the position of the detector 120 or the first integrating sphere 130 may vary.

The detector 120 or the first integrating sphere 130 may be disposed on a spherical surface of a fixed diameter "a". A polar angle between the first integrating sphere 130 or the detector 120 and the z-axis is $\theta$. An azimuthal angle between a position of the detector 120 mapped to the x-y plane and an x-axis is $\phi$. The detector 120 may rotate the spherical surface according to a value of the polar angle on the basis of the rotating axis of the detector 120.

The polar angle may be scanned according to the rotation of the rotating axis of the detector 120, and the azimuthal angle may be scanned according to the rotation of the light source 110. Thus, the spectral radiant intensity or the spectral irradiance may be measured at all position on the spherical surface of the fixed radius.

If a value of the spectral radiant intensity of the detector 120 is calibrated, a differential solid angle $d\Omega$ is $|\sin\theta|d\theta d\phi$ at the azimuthal angle $\phi$ set by the rotation of the light source 120 and the polar angle $\theta$ set by the rotation of the detector 120.

The light source 110 is disposed at the origin of the spherical coordinate system. As the light source rotates on the z-axis, the azimuthal angle $\phi$ indicating the position of the detector 120 or the first integrating sphere may vary. The detector 120 may vary depending on the rotation of the rotating axis of the detector 120. Thus, the differential solid angle $d\Omega$ on a spherical surface coordinate (R, θ, φ) set by the azimuthal angle φ set by the rotation of the light source 120 and the polar angle θ set by the rotation of the detector 120 is given as below.

$$d\Omega = |\sin\theta| d\theta d\phi$$

If a value of the spectral radiant intensity I of the detector 120 is calibrated, the total spectral radiant flux is given by Equation (1) below.

$$\Phi(\lambda) = \int_0^\pi [\int_0^{2\pi} I(\theta,\phi;\lambda)|\sin\theta| d\theta] d\phi \quad \text{Equation (1)}$$

The spectral irradiance E of the detector 120 is calibrated, the Equation (1) is given by Equation (2) below according to a relational expression between the spectral radiant intensity I and the spectral irradiance E ($I = r^2 E$).

$$\Phi(\lambda) \equiv \int_0^\pi \left[\int_0^{2\pi} I(\theta,\phi;\lambda)|\sin\theta| d\theta\right] d\phi \quad \text{Equation (2)}$$
$$= R^2 \int_0^\pi \left[\int_0^{2\pi} E(\theta,\phi;\lambda)|\sin\theta| d\theta\right] d\phi$$

As a result, if the spectral radiant intensity I or the spectral irradiance E is measured at a suitable polar angle interval dθ and a suitable azimuthal angle interval dφ throughout a virtual spherical surface and the value is added to the differential solid angle, the total spectral radiant flux is obtained.

If the spectral radiant intensity I or the spectral irradiance E is measured at all polar angles and all azimuthal angles on the spherical surface of the fixed radius, the total spectral radiant flux is obtained through the Equation (2).

However, the above method requires lots of time to obtain the total spectral radiant flux. Accordingly, there is a need for a method of obtaining a total spectral radiant flux within short time. In particular, a sin θ operation is required to obtain the total spectral radiant flux.

According to an example embodiment of the present disclosure, a computer does not perform a sin θ operation but a light intensity modulator performs the sin θ operation. Thus, dθ integration of the Equation (2) may be replaced with exposure of the detector 120 during an integration period of θ.

According to an example embodiment of the present disclosure, the detector 120 may be exposed to an integration period (e.g., 0 to 2π) of the polar angle θ to measure a total spectral radiant flux at high speed. According to the polar angle θ, the spectral radiant intensity I may be modulated by |I sin θ| with respect to the integrating period of a polar angle of the detector 120.

A light intensity modulator 140 may be provided for |I sin θ| modulation of the spectral radiant intensity I or the spectral irradiance E. The light intensity modulator 140 may perform a sin θ operation on the light intensity of incident light.

The light intensity modulator 140 may control a transmitting area to control the light intensity. Specifically, the light intensity modulator 140 may have two slits spaced apart from each other. When an aligned position of a first slit and a second slit is changed, an overlap area or a light transmitting area may be modulated.

According to a modified embodiment of the present disclosure, the light intensity modulator 140 may include a pair of polarizing plates perpendicular to each other and a polarizing modulator disposed between the pair of polarizing plates. The polarizing modulator may be a liquid crystal cell. The light intensity modulator 140 may modulate the intensity of output light according to a voltage applied to the polarizing modulator.

Light impinging on the light intensity modulator 140 may have incident angle dependency. The first integrating sphere 130 may be disposed at a front end of the light intensity modulator 140 to remove the incident light dependency. The first integrating sphere 130 may remove the incident light dependency of light provided to the first integrating sphere 130. The first integrating sphere 130 may be a cosine responder.

The cosine responder may provide a relation proportional to cos β that is an ideal relation when β refers to an angle between an incident direction and a normal line of an incident surface that is a response characteristic of output light in an incident direction of provided light. Specifically, the cosine responder may be changed to a form where an aperture is attached to a diffusion plate such as an opal glass.

The total spectral radiant flux may be spectrumized to be measured. To achieve this, the detector 120 may include a spectrometer and a photosensor array. The spectrometer may spatially disperse light according to wavelengths. The spectrometer may employ a diffraction grating or a prism. The photosensor array may measure the light spatially dispersed according to the wavelengths. Each cell of the photosensor array may measure an integration value of a sin θ-modulated value of the spectral radiant intensity I or the spectral irradiance E at a specific wavelength. To achieve this, the detector 120 may be synchronized with the rotating amount of the rotating axis of the detector 120 or a value of the polar angle θ. Specifically, the detector 120 may measure the intensity of light exposed to an integration period of the polar angle θ. The detector 120 may measure the spectrum that is θ-integrated to a predetermined azimuthal angle.

Then the azimuthal angle φ is changed, and the detector 120 may re-measure the intensity of the light exposed to the integration period of the polar angle θ.

If the procedure is repeated, the detector 120 may measure spectral spectrum that is θ-integrated to a predetermined azimuthal angle with respect to all azimuthal angles φ.

A controller 198 may operate the θ-integrated spectral spectrum to calculate a total spectral radiant flux.

Hereinafter, a measuring method of a gonio-spectroradiometer according to an example embodiment of the present disclosure will now be described.

As the light source 110 rotates on a rotating axis, an azimuthal angle of the detector 120 or the first integrating sphere may vary. The first integrating sphere 130 may perform circular motion along a circular revolving orbit with a constant radius around the light source 110 with respect to a revolving axis perpendicular the rotating axis of the light source 110 (or the rotating axis of the detector 120). The polar angle θ of the first integrating sphere may be set by the rotation amount of the revolving axis (or the rotating axis of the detector 120).

The revolving orbit may be an orbit where the detector 120 or the first integrating sphere 130 performs a rotational motion. However, the first integrating sphere 130 may be disposed at the front end of the light intensity modulator 140 to remove incident angle dependency. Accordingly, the revolving orbit is substantially a motion orbit of the first integrating sphere. If the first integrating sphere is replaced with an aperture by a diffusion plate, the revolving orbit is a motion orbit of the aperture.

The first integrating sphere 130 may provide incident angle dependency of light provided from a light source to be proportional to cos β that is an ideal relation when cos β refers to an angle between an incident direction and a normal line of an incident surface. The light intensity modulator 140 may modulate light transmitting the first integrating sphere 130 according to a polar angle. The light whose light intensity is modulated according to the polar angle is detected after being accumulated in an integration period of the polar angle. On the other hand, the detector 120 detects light integrated to the integration period of the polar angle.

The gonio-spectroradiometer may include a detector. The detector may include a spectrometer and an array photodetector. Specifically, the array photodetector may be a one-dimensionally or two-dimensionally arranged charge-coupled device (CCD). Exposed time of the array photodetector of the spectrometer may be equal to time taken for the first integration sphere to revolve the revolving orbit once.

The detector 120 may measure a spectral distribution and the light intensity of light emitted from the light source 110. After a rotating axis (or revolving axis) of the detector 120 rotates once, the rotating axis of the light source 110 may rotate at regular unit angular intervals. Thus, the azimuthal angle may vary by a regular unit angle.

Then, the rotating axis (or revolving axis) of the detector 120 may rotate once at the varied azimuthal angle.

Then, the rotating axis of the light source 110 may rotate at regular angle intervals. As a result, the azimuthal angle may sequentially vary from zero degree to 180 degrees with the regular unit angle intervals. When scanning the azimuthal angle is completed, the measurement is completed.

The controller 198 may operate the θ-integrated spectrum to calculate a total spectral radiant flux.

Now, a light transmission procedure is described. Light emitted from a light source impinges on an input opening of the first integrating sphere. The first integrating sphere outputs incident angle dependency of incident light to be proportional to cos β that is an ideal relation when β refers to an angle between an incident direction and a normal line of an incident surface. A light intensity modulator modulates and outputs the intensity of provided light according to a polar angle. The light intensity modulator outputs light whose light intensity is modulated according to a polar angle. A detector outputs a signal proportional to the intensity of incident light.

The measurement can be performed as below. It will be assumed that a measurement-target light source is already lit.

The rotating axis of the light source 110 is set to a reference position. Specifically, an azimuthal angle φ is set to zero degree.

The rotating axis or revolving axis of the detector 120 is set to a reference position (e.g., 355 degrees). Specifically, a polar angle θ is set to 355 degrees. As the rotating axis of the detector 120 rotates, the polar angle θ varies as follows: 355 degrees→zero degree→1 degree→360 degrees→5 degrees. When the polar angle θ passes zero degree, an optical interrupt may generate an exposure start signal. The exposure start signal may operate the detector 120. The optical interrupt may generate an exposure end signal after rotating once when the polar angle θ passes 360 degrees. The exposure end signal may stop the operation of the detector 120. The detector 120 may measure provided light intensity during a time interval between the exposure start signal and the exposure end signal.

The exposure start signal may be a TTL pulse. The exposure start signal may trigger exposure start of a spectrometer to start measurement of the spectrometer. The exposure end signal may be a TTL pulse. The exposure end signal may trigger exposure end of the spectrometer to end the measurement of the spectrometer. A spectral spectrum y(λ) obtained from this result has a relational express below.

$$y(\phi=0,\lambda) \propto hw \int_0^{2\pi} I(\theta,\phi=0;\lambda)|\sin\theta|d\theta$$

$$y(\phi=0,\lambda) = A \int_0^{2\pi} I(\theta,\phi=0;\lambda)|\sin\theta|d\theta \quad \text{Equation (3)}$$

In the Equation (3), I(θ, φ) represents a value of spectral radiant intensity in a coordinate (θ, φ). By using a standard lamp whose spectral radiant intensity or spectral irradiance is known, a proportional constant A may be introduced in the Equation (3). Thus, the spectral spectrum y(λ) may be calibrated to have an absolute scale.

When the azimuthal angle φ varies in unit of Δφ, Δφ may be equal to π/N (Δφ=π/N, N being a positive integer). The positive integer N may be any number (usually, 10~100). Accordingly, $\phi_i$ may be equal to $i\phi_i = i\Delta\phi$, i being a variable between zero and N).

The total spectral radiant flux may be expressed as below.

$$\Phi(\lambda) \equiv \int_0^\pi \left[ \int_0^{2\pi} I(\theta, \phi; \lambda)|\sin\theta|d\theta \right] d\phi \quad \text{Equation (4)}$$

$$= \frac{1}{A} \sum_{i=0}^{N} y(\phi_i, \lambda) \Delta\phi$$

A conventional gonio-spectroradiometer may measure a spectral distribution every time at each position (θ, φ). Thus, measurement speed is very low. It takes more than an hour at least to complete the overall measurement. Meanwhile, a high-speed gonio-spectroradiometer according to an example embodiment of the present disclosure measures a spectral radiant flux for one-time rotation of a rotating axis of a detector (an integration period of a polar angle θ) with the one-time exposure of a spectrometer. Thus, measurement speed may be significantly improved.

Figure 2:
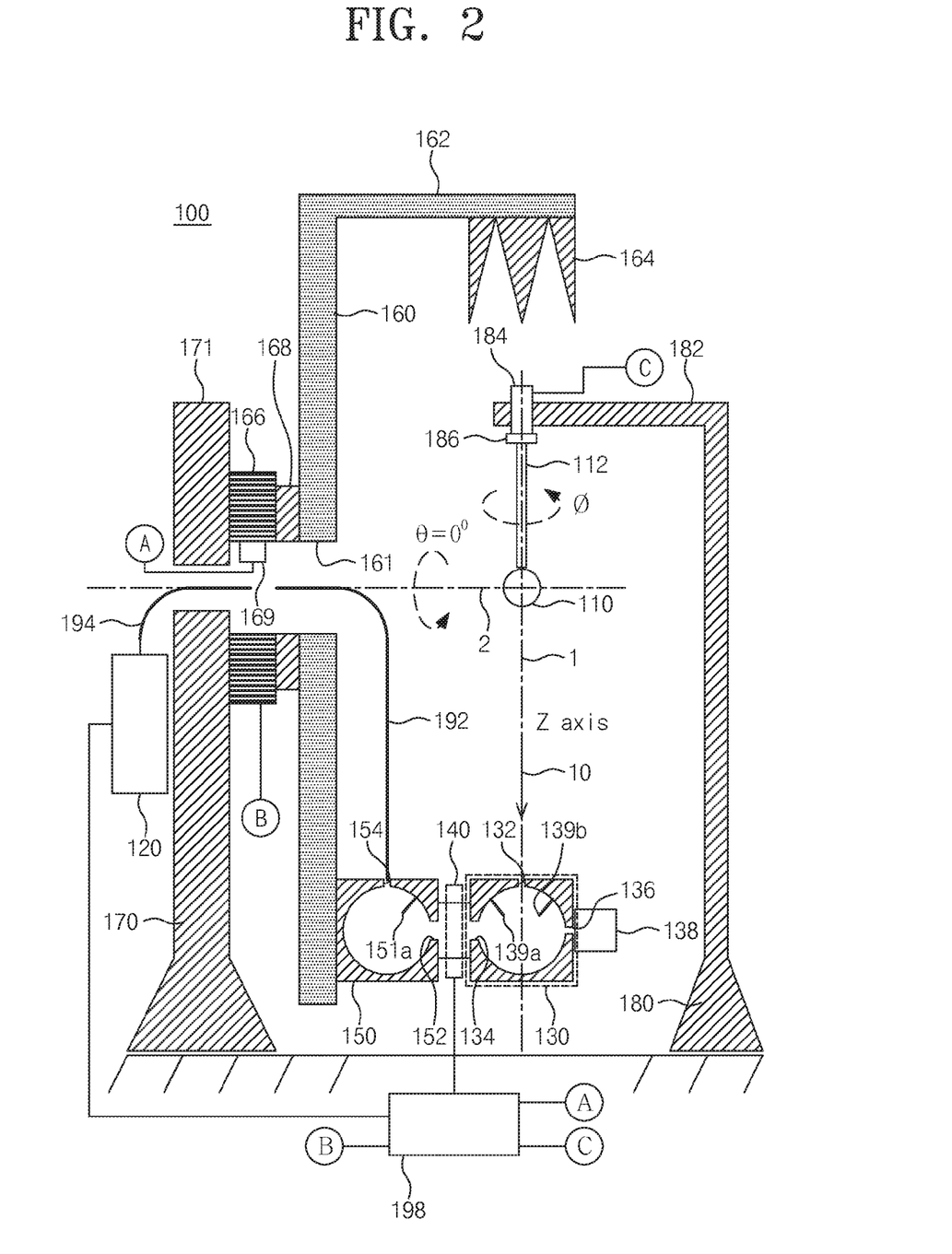
FIG. 2 is a cross-sectional view of an optical device according to an example embodiment of the present disclosure.

FIG. 2 is a cross-sectional view of an optical device according to an example embodiment of the present disclosure.

Figure 3:
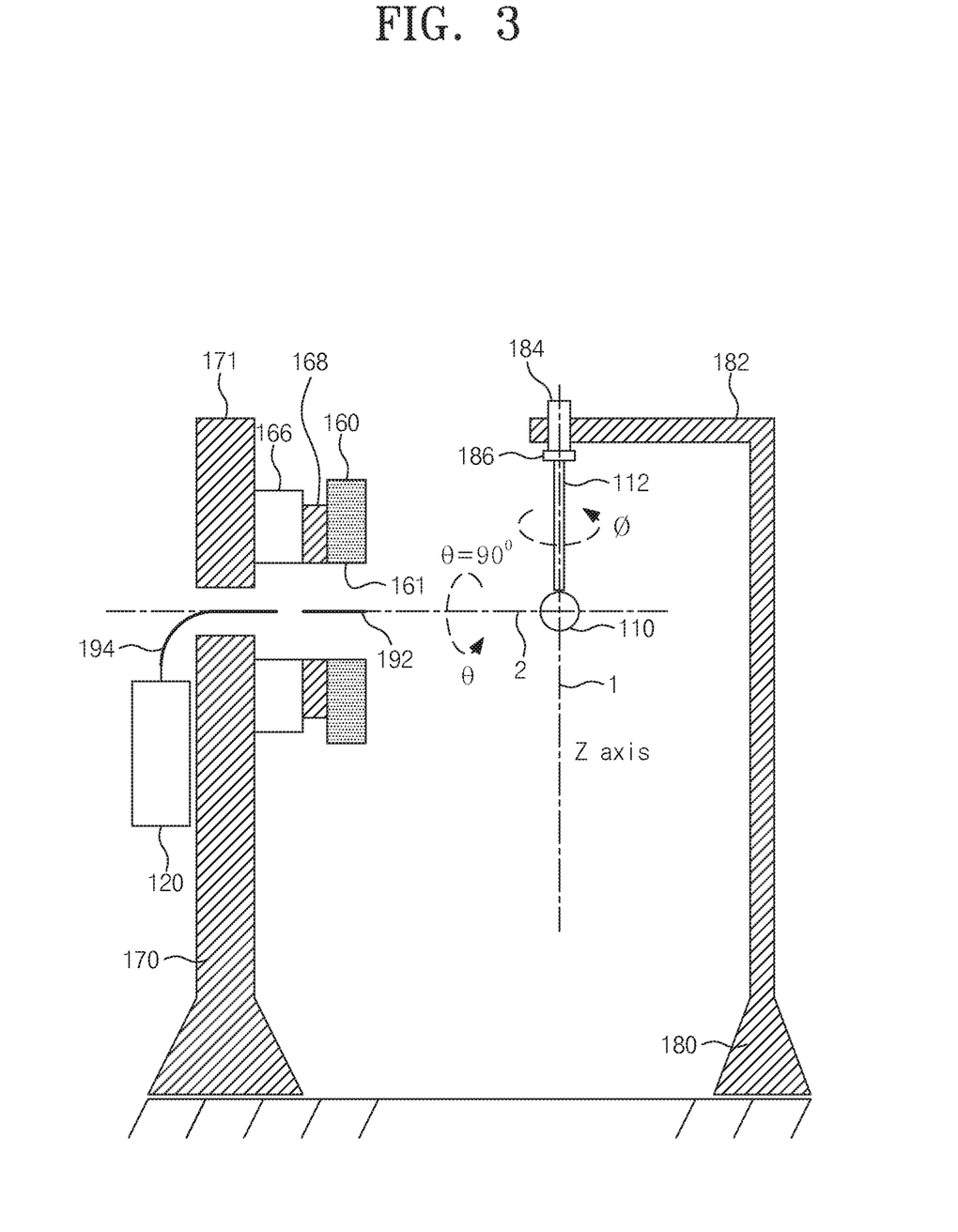
FIG. 3 is a cross-sectional view illustrating a rotated state of a light intensity modulator in FIG. 2.

FIG. 3 is a cross-sectional view illustrating a rotated state of a light intensity modulator in FIG. 2.

Referring to FIGS. 2 and 3, an optical device 100 includes a light source 110 rotating on a light source axis 1, a first integrating sphere 130 revolving around the light source 110 with respect to a revolving axis 2 perpendicular to the light source axis 1 with a fixed radius and including an entrance formed in a direction to see the light source 110, a light intensity modulator 140 adapted to modulate light intensity of light received through the first integrating sphere 130 according to the rotation amount of the revolving axis 2, and a detector 120 adapted to measure output light of the light intensity modulator 140 at each wavelength.

The optical device 100 may be a goniometer having a rotating axis and a revolving axis of a light source. The light source axis 1 may be a rotating axis of the light source 110 that rotates thereon.

The light source 110 may be a directional light source, an ultraviolet light source, an infrared light source, and a surface light source. The light source 110 may have angular distribution characteristics of luminous intensity with an angle-dependent light intensity distribution. The light source 110 may be an LED light source or an OLED light source.

The light source 110 may rotate on the rotating axis (z-axis) of the light source 110. The light source 110 may be replaced with a standard lamp for calibration. The standard lamp may have already-known spectral radiant intensity or spectral irradiance.

The light source 110 may be mounted on one end of a light source mounting rod 112. The light source mounting rod 112 may be in the form of a cylindrical pipe, and an electrical wiring may be disposed in the light source mounting rod 112. The light source mounting rod 112 may vertically extend from the surface of the earth in a z-axis direction. The light source mounting rod 112 may be fixedly coupled with the light source 110 to rotate therewith.

The light source mounting rod 112 may be connected to a light source rotation driving part 184 through a light source slip ring 186. The light source slip ring 186 may transfer rotational force of the light source rotation driving part 184 to the light source mounting rod 112 and make electrical connection with an external entity. The light source slip ring 186 may serve to transfer an electrical signal to a rotating portion. The light source slip ring 186 may include a rotor and a stator, similar to a motor, to connect electrical conduction between the rotor and the stator.

A rotating axis of the light source 110 may rotate 180 degrees, and means for mounting a measurement target light source is provided at the end of the light source mounting rod 112.

The light source rotation driving part 184 may be an electric step motor. The light source driving part 184 may vary azimuthal angles at regular unit intervals. The light source rotation driving part 184 may be controlled by a control signal of the controller 198. The light source slip ring 186 may be mounted on the light source rotation driving part 184. The light source slip ring 186 may connect a light source line and a control line that may turn on and control the light source 110.

The light source rotation driving part 184 may be fixed to a horizontal light source support 182. The horizontal light source support 182 may extend in a horizontal direction parallel to the surface of the earth. The light source rotation driving part 184 may be disposed at one end of the horizontal light source support 182, and the other end of the horizontal light source support 182 may be connected to a vertical light source support 182. The vertical light source support 180 may be fixed to the surface of the earth.

A standard lamp may be mounted at a position where a light source desired to be measured is removed. Spectral irradiance or spectral radiant intensity of the standard lamp may be already known. Therefore, a value measured by the detector 120 may be converted into an absolute unit. The standard lamp may be used for calibration.

A revolution support 170 extends vertically from the surface of the earth and supports a revolution motion driving part 166. The revolution support 170 may have a through-hole 171.

The revolution motion driving part 166 may be disposed at the through-hole 171 of the revolution support 170. The revolution motion driving part 166 may include a driving motor to provide rotational force. The revolution motion driving part 166 may be aligned in a direction of the revolving axis 2. The revolving axis 2 may rotate 360 degrees. The revolution motion driving part 166 may have a through-hole formed in its center.

A revolution rotating plate 160 may be spaced apart from the light source 110 by a fixed distance to rotate on the revolving axis 2. The revolution rotating plate 160 receives a rotational force from the revolution motion driving part 166 to rotate. The revolution rotating plate 160 may be a rectangular plate.

The revolution rotating plate 160 may have a through-hole 161 formed in its center region. The through-hole 161 may be aligned with the through-hole 171 of the revolution support 170.

The revolution slip ring 168 may be disposed between the revolution motion driving part 160 and the revolution rotating plate 160. Thus, the revolution slip ring 168 may transfer rotational force to the revolution rotating plate 160. An electrical signal and power required for the light intensity modulator 140 and the photometer 138 may be transferred through the revolution slip ring 168.

One end of the revolution rotating plate 160 may be connected to an light trap support plate 162. The light trap support plate 162 may extend in the horizontal direction.

The light trap plate 164 may extinguish light impinging on an light trap 164 to prevent reflected light from entering the entrance of the first integrating sphere 130.

The first integrating sphere 130 may be mounted at the other end of the revolution rotating plate 160. The first integrating sphere 130 may be disposed opposite to the light trap 164.

The detector 120 may be mounted at the revolution support 170 to achieve mechanical stability resulting from revolution motion. In addition, an optical fiber may be used to transfer an optical signal between the detector 120 and a second integrating sphere 150.

One end of a first optical fiber 192 may be connected to an exit of the second integrating sphere 150. The first optical fiber 192 may be an optical fiber bundle including a plurality of optical fibers.

A second optical fiber 194 may have one end to receive light from the other end of the first optical fiber 192. The other end of the second optical fiber 194 may be connected to the detector 120. The second optical fiber 194 may be an optical fiber bundle including a plurality of optical fibers.

The first integrating sphere 130 may receive light emitted from the light source 110. The first integrating sphere 130 may have an entrance 132 and an exit 134. The light emitted from the light source 110 may be introduced into the first integrating sphere 130 through the entrance 132. The entrance 132 may be aligned in an extending direction of the revolution rotating plate 160. The exit 134 may be mounted in the horizontal direction. A diffusion plate may be disposed at the exit 134. The diffusion plate may be opal glass, Teflon plate or ground glass. The diffusion plate convert light emitted from the exit 134 into light having uniform luminance to receive the amount of the light emitted from the exit 134 irrespective of an angle and a position when the first optical fiber 192 is connected to the exit 134.

A first light shielding plate 139a may be disposed inside the first integrating sphere 130. The first light shielding plate 139a may be in the form of a circular plate. The first light shielding plate 139a may prevent the light impinging on the entrance 132 from directly passing through the exit 134 without being reflected on an internal surface. The first integrating sphere 130 may further include an auxiliary exit 136. A second light shielding plate 139b may be disposed between the entrance 132 and the exit 134. A diffusion plate (not shown) may be disposed at the auxiliary exit 136. The photometer 138 may be disposed at the back of the auxiliary exit 136. The auxiliary exit 136 may be horizontally disposed opposite to the exit 134. An optical current signal read by the photometer 138 may be connected to an ammeter (not shown) mounted on a revolution support plate through the revolution slip ring 186. The photometer 138 and the ammeter (not shown) may read and write a signal proportional to the light intensity at each angular position to be used to additionally calculate a total luminous flux.

The light intensity modulator 140 may modulate the intensity of light provided through the exit 134 of the first integrating sphere 130 according to a revolution angle or a polar angle.

Figure 4:
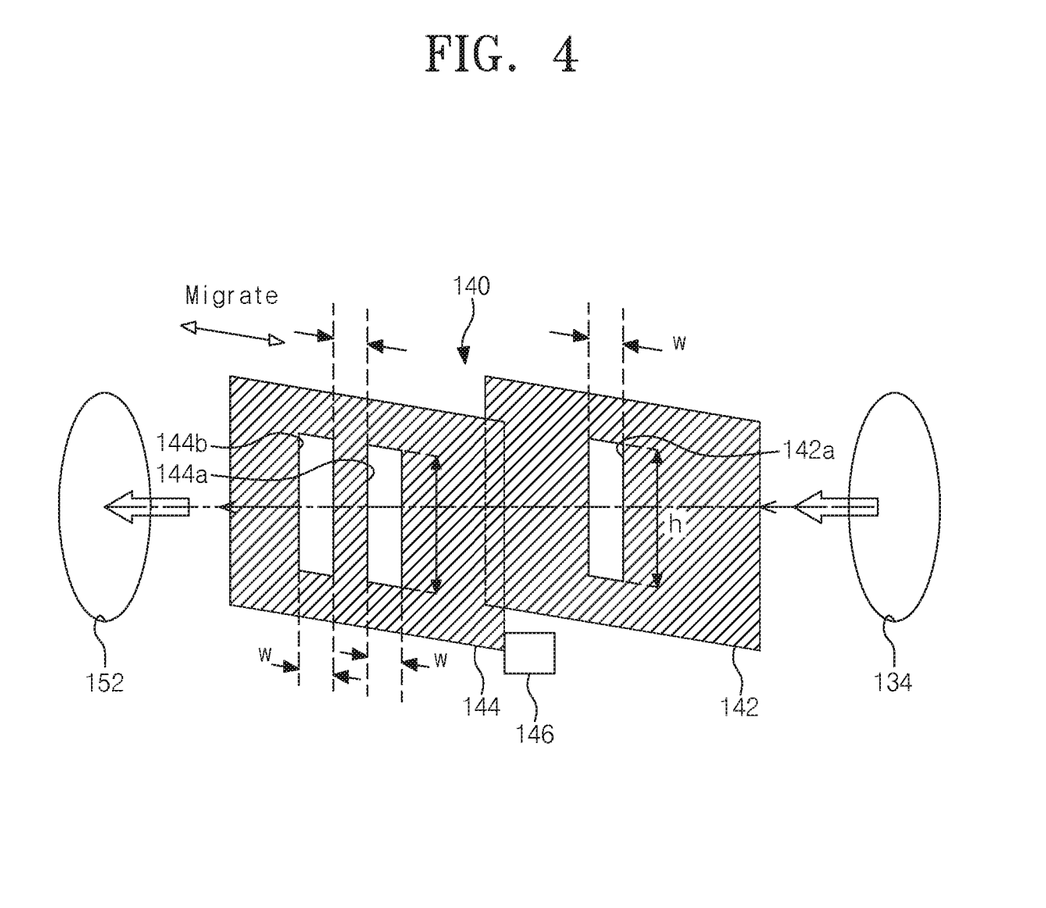
FIG. 4 is a perspective view of a light intensity modulator according to an example embodiment of the present disclosure.

FIG. 4 is a perspective view of a light intensity modulator according to an example embodiment of the present disclosure.

Figure 5A:
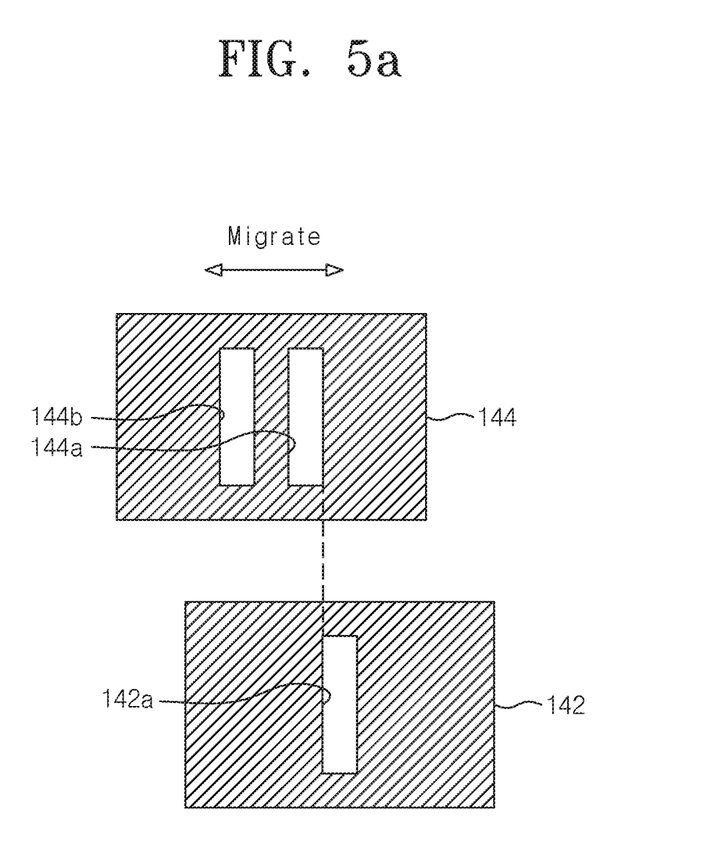
FIGS. 5A and 5B are a conceptual diagram illustrating the function of the light intensity modulator in FIG. 4.
Figure 5B:
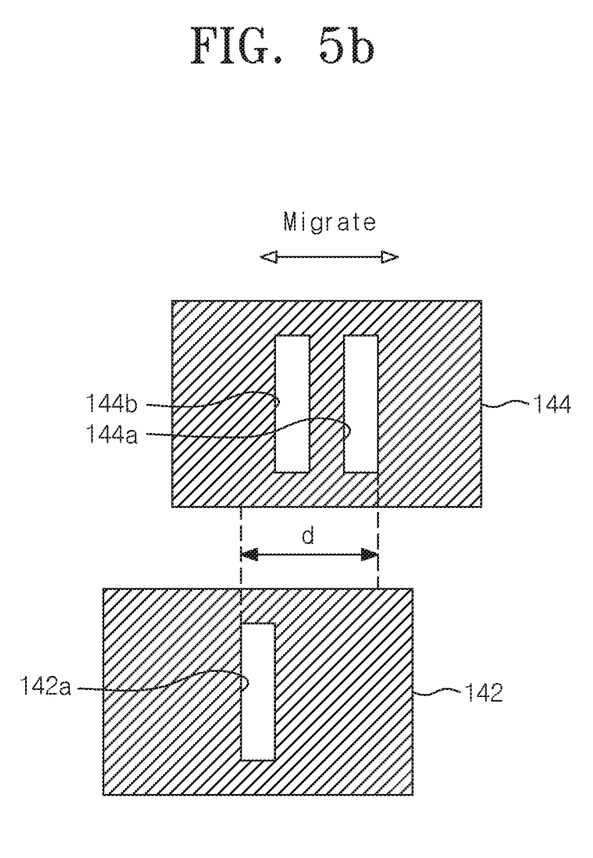

FIGS. 5A and 5B are a conceptual diagrams illustrating the function of the light intensity modulator in FIG. 4.

Figure 5C:
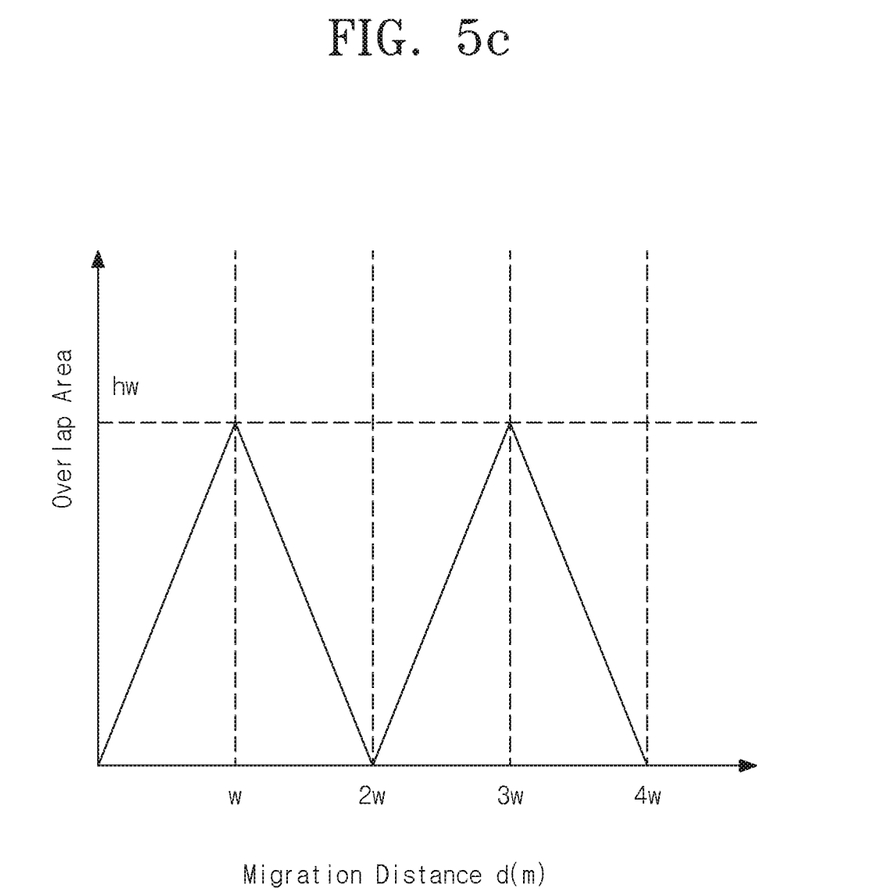
FIGS. 5C and 5D illustrate an overlap area according to a migration distance and a polar angle of the light intensity modulator in FIG. 4.
Figure 5D:
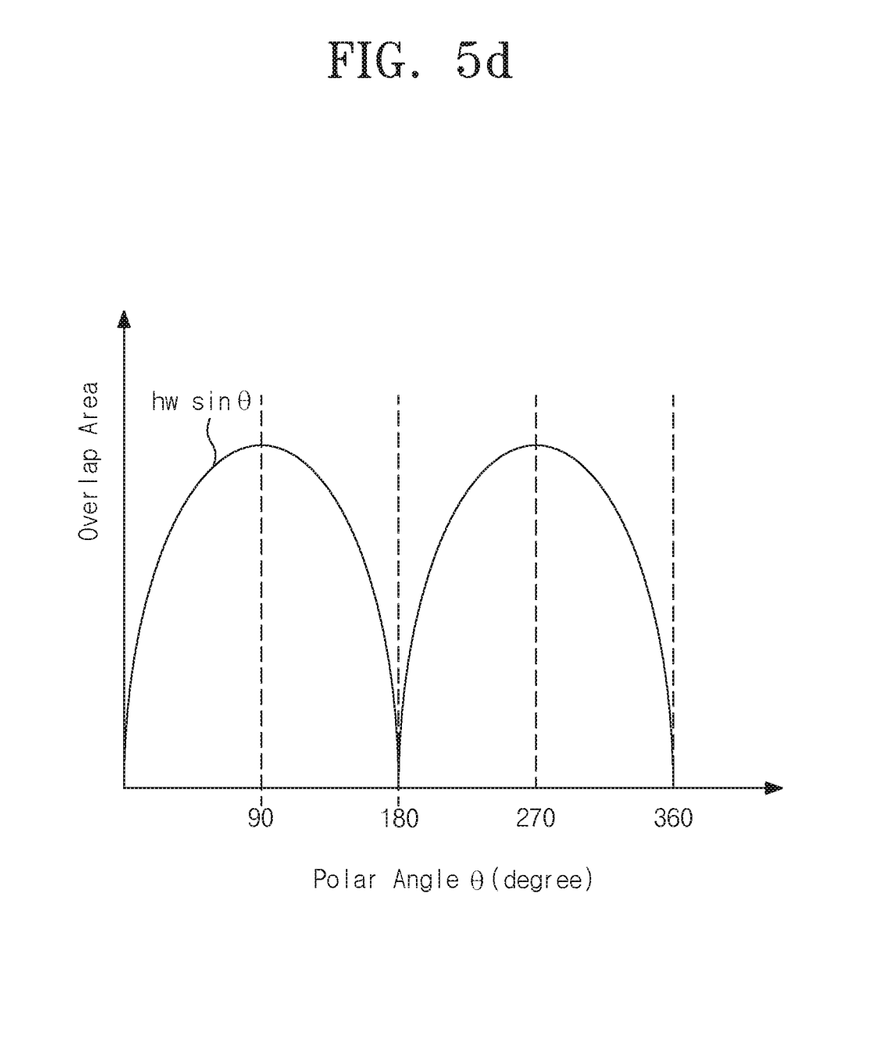

FIGS. 5C and 5D illustrate an overlap area according to a migration distance and a polar angle of the light intensity modulator in FIG. 4.

Referring to FIGS. 4 and 5A to 5D, the light intensity modulator 140 includes a fixed slit plate 142 having an opening 142a of constant first width, a movable slit plate 144 having a first slit 144a having the first width and a second slit 144b spaced apart from the first slit 144a by the first width and having the first width, and a movable slit driving part 146 adapted to move the movable slit plate 144 according to a rotation angle of the revolution motion. An overlap area between the fixed slit plate 142 and the movable slit plate 144 is an absolute value of a sine function of the rotation angle of the revolution motion according to the rotation angle of the movable slit plate.

The fixed slit plate 142 may be aligned with the exit 134 of the first integrating sphere 130. Specifically, the opening 142a of the fixed slit plate 142 may have first width "w" and height "h". The first width "w" and the height "h" may be smaller than a radius of the exit 134 of the first integrating sphere 130. An extending direction of the opening 142a may be an extending direction of the revolution rotation plate 160. The fixed slit plate 142 and the movable slit plate 144 may be spaced apart from each other, parallel to each other. The spaced distance "d" may be about 0.1 mm. The spaced distance "d" may be almost equal to thickness of a plate constituting the fixed slit plate 142.

The movable slit plate 144 may have double slits. Each slit of the double slits may have the same shape as a slit of the fixed slit plate 142. The movable slit plate 144 may migrate in a width direction. A migration direction "d" between the fixed slit plate 142 and the movable slit plate 144 may vary depending on a polar angle. The double slit may have the same width. A distance between the double slits may be equal to width of each slit. The migration distance "d" may be a vertical distance between a left side surface of a single slit of the fixed slit plate 142 and a right side surface of the double slits of the movable slit plate 144.

The intensity of light passing through the fixed slit plate 142 and the movable slit plate 144 may be proportional to an open overlap area. The fixed slit and the movable slit may be mathematically expressed as convolution. The overlap area may be in the form of a triangular wave according to the migration distance "d". Thus, the light intensity modulator 140 may perform intensity modulation depending on a polar angle θ. The overlap area may be in the form of a half-wave rectified sine wave according to the polar angle θ.

If an interval of a pulse signal provided to the movable slit driving part 146 driving the movable slit plate 144 is controlled, the overlap area may be controlled to be hw| sin θ| according to the polar angle θ.

According to a modified embodiment of the present disclosure, the light intensity modulator 140 may vary depending on the polar angle θ as long as it performs the intensity modulation.

If the detector 120 is directly disposed at an output terminal of the light intensity modulator 140, then intensity of output light of the light intensity modulator 140 may sensitively depend on not only the overlap area but also an angle and a position where the detector 120 is disposed. Accordingly, the second integrating sphere 150 may be disposed such that an output signal of the detector 120 depends on only the overlap area.

The second integrating sphere 150 may be disposed between the light intensity modulator 140 and the detector 120. The second integrating sphere 150 may receive the output light of the light intensity modulator 140 to suppress area incident angle dependency or area dependency of incident beam. A size of an entrance 152 of the second integrating sphere 150 may be sufficiently larger than width of the slit. Accordingly, the output light of the light intensity modulator 140 may be transferred to the second integrating sphere 150. The second integrating sphere 150 may include a light shielding plate 151a therein. The light shielding plate 151a may prevent light impinging on the second integrating sphere 150 from being directly emitted to an exit 154 of the second integrating sphere 150 without being reflected or scattered. A diffusion plate may be disposed at the exit 154 of the second integrating sphere 150.

The second integrating sphere 150 may be disposed at the other end of the revolution rotating plate 160. The first integrating sphere 130 and the second integrating sphere 150 may be spaced apart from each other to be fixedly coupled with each other. The entrance 152 of the second integrating sphere 150 may be horizontally aligned with the exit 134 of the first integrating sphere 130. The exit 154 of the second integrating sphere 150 may be vertically formed.

Returning to FIG. 2, one end of the first optical fiber 192 may be connected to the exit 154 of the second integrating sphere 150. The first optical fiber 194 may be an optical fiber bundle including a plurality of optical fibers.

The second optical fiber 194 may have one end to receive light from the other end of the first optical fiber 192. The other end of the second optical fiber 194 may be connected to the detector 120. The second optical fiber 194 may be an optical fiber bundle including a plurality of optical fibers.

The other end of the first optical fiber 192 and one end of the second optical fiber 194 may be spaced apart from each other to be aligned with each other. Accordingly, twisting of the first and second optical fibers 192 and 194 may be eliminated. The other end of the first optical fiber 192 and one end of the second optical fiber 194 may be disposed around a through-hole formed at the revolution rotating plate 160.

For example, the other end of the first optical fiber 192 may be fixed to a motor rotor of the revolution motion driving part 166 and one end of the second optical fiber 194 may be fixed to a motor stator of the revolution motion driving part 166. In this case, an intersection between the other end of the first optical fiber 192 and one end of the second optical fiber 194 is a position where rotation occurs. The two ends are spaced apart from each other by about 1 mm and may not be in contact with each other.

Both the revolution motion driving part 166 and the revolution slip ring 168 have through-holes in their centers of rotation, respectively.

An optical interrupter 169 may be disposed around the revolution rotating plate 160. Alternatively, the optical interrupter 169 may be mounted at a zero-degree position of the revolution motion driving part 166, inside or around the revolution motion driving part 166. Accordingly, when the revolution rotating plate 160 passes through the zero-degree position, the optical interrupter 169 may generate a TTL pulse. The TTL pulse may be used as an exposure start trigger signal and an exposure end trigger signal of the detector 120.

The detector 120 may measure the light intensity integrated into a cycle of the revolution motion. The detector 120 may include a spectroscope and an array photosensor. The detector 120 may measure the light intensity integrated into an integration period (zero degree to 360 degrees) of a polar angle.

According to a modified embodiment of the present disclosure, the detector 120 may be directly connected to the exit 154 of the second integrating sphere 150.

The controller 198 may control the revolution motion driving part 160 to vary a polar angle and control the detector 120 synchronized with the polar angle. In addition, the controller 198 may control the light source rotation driving part 184 to vary an azimuthal angle. In addition, the controller 198 may receive an output of the detector 120 as an input and operate the input to calculate a total spectral radiant flux. The controller 198 may receive an output signal of a photometer. A total luminous flux can be calculated from the output signal of the photometer.

Speed of a conventional gonio-spectroradiometer is very low because spectral distribution is always measured at each position (θ, φ). Accordingly, several hours are required until the whole measurement is completed.

Meanwhile, a gonio-spectroradiometer according to an example embodiment of the present disclosure measures a spectral radiant flux for one-time rotation of a polar angle with one-time exposure of the detector 120. Thus, measurement speed may be significantly improved.

As described above, an optical device according to example embodiment of the present disclosure may measure a total spectral radiant flux at high speed without an error caused by angular distribution of luminous intensity and fluorescence for a light source, an ultraviolet light source or an infrared light source having various directivities.

Although the present disclosure has been described in connection with the embodiment of the present disclosure illustrated in the accompanying drawings, it is not limited thereto. It will be apparent to those skilled in the art that various substitutions, modifications and changes may be made without departing from the scope and spirit of the present disclosure.

What is claimed is:

1. A gonio-spectroradiometer comprising:
a light source for rotating on a light source axis;
a first integrating sphere revolving around the light source with respect to a revolving axis perpendicular to the light source axis with a fixed radius and including an entrance formed in a direction to see the light source;
a light intensity modulator adapted to modulate light intensity of light received through the first integrating sphere according to the rotation amount of the revolving axis; and
a detector adapted to measure output light of the light intensity modulator at each wavelength.

2. The gonio-spectroradiometer as set forth in claim 1, wherein the light intensity modulator comprises:
a fixed slit plate having an opening of constant first width;
a movable slit plate having a first slit having the first width and a second slit spaced apart from the first slit by the first width and having the first width; and
a movable slit driving part adapted to move the movable slit plate according to a rotation angle of the revolution motion,
wherein an overlap area between the fixed slit and the movable slit is a sine function of the rotation angle of the revolution motion according to the rotation angle of the movable slit plate.

3. The gonio-spectroradiometer as set forth in claim 1, further comprising:
a second integrating sphere having an entrance disposed between the light intensity modulator and the detector to receive output light of the light intensity modulator.

4. The gonio-spectroradiometer as set forth in claim 1, wherein the detector measures the light intensity at each wavelength integrated into a cycle of the revolution of the first integrating sphere.

5. The gonio-spectroradiometer as set forth in claim 1, further comprising:
a revolution rotating plate spaced apart from the light source by a fixed distance to rotate on the revolving axis;
a light trap support plate connected to one end of the revolution rotating plate;
a light trap mounted at the light trap support plate; and
a revolution motion driving part disposed on the revolving axis of the revolution rotating plate to provide rotational force to the revolution rotating plate,
wherein the first integrating sphere mounted at the other end of the revolution rotating plate is disposed opposite to the light trap.

6. The gonio-spectroradiometer as set forth in claim 5, further comprising:
a second integrating sphere having an entrance disposed between the light intensity modulator and the detector to receive output light of the light intensity modulator,
wherein the second integrating sphere is disposed at the other end of the revolution rotating plate,
the first integrating sphere and the second integrating sphere are spaced apart from each other to be fixedly coupled with each other, and
the light intensity modulator is disposed between an exit of the first integrating sphere and an entrance of the second integrating sphere.

7. The gonio-spectroradiometer as set forth in claim 6, further comprising:
a revolution support plate extending vertically from the surface of the earth and supporting the revolution motion driving part;
a first optical fiber having one end connected to an exit of the second integrating sphere; and
a second optical fiber having one end to receive light from the other end of the first optical fiber,
wherein the other end of the second optical fiber is connected to the detector, and
the detector is mounted at the revolution support plate.

8. A measuring method of a gonio-spectroradiometer having a rotating axis of a light source and a revolving axis perpendicular to the rotating axis of the light source, comprising:
measuring light emitted from the light source at each wavelength while modulation of the intensity of the light is performed as a function of a polar angle that is a rotation angle of the revolving axis during successive rotation of the rotating axis with respect to a predetermined integration period.

9. The measuring method as set forth in claim 8, wherein the modulation of the intensity of the light is $|\sin\theta|$.

10. The measuring method as set forth in claim 8, further comprising:
varying a rotation angle of the rotating axis of the light source.

11. The measuring method as set forth in claim 8, further comprising:
measuring light emitted from the light source at each wavelength while modulation of the intensity of the light is performed as a polar angle that is a polar angle of a rotating axis of the standard lamp and the revolving axis during successive rotation of the revolving axis with respect to a predetermined integration period using the standard lamp whose spectral radiant intensity or spectral irradiance is known.

* * * * *